(12) United States Patent
Doerr et al.

(10) Patent No.: US 12,478,791 B2
(45) Date of Patent: Nov. 25, 2025

(54) IMPLANTABLE MEDICAL DEVICE COMPRISING AN ENERGY STORAGE DEVICE

(71) Applicant: BIOTRONIK SE & Co. KG, Berlin (DE)

(72) Inventors: Thomas Doerr, Berlin (DE); Volker Lang, Berlin (DE); Tim Traulsen, Pirna (DE)

(73) Assignee: BIOTRONIK SE & Co. KG, Berlin (DE)

( * ) Notice: Subject to any disclaimer, the term of this patent is extended or adjusted under 35 U.S.C. 154(b) by 306 days.

(21) Appl. No.: 17/795,112

(22) PCT Filed: Jan. 8, 2021

(86) PCT No.: PCT/EP2021/050285
§ 371 (c)(1),
(2) Date: Jul. 25, 2022

(87) PCT Pub. No.: WO2021/151633
PCT Pub. Date: Aug. 5, 2021

(65) Prior Publication Data
US 2022/0379123 A1 Dec. 1, 2022

(30) Foreign Application Priority Data

Jan. 31, 2020 (EP) .................................. 20154891

(51) Int. Cl.
*A61N 1/375* (2006.01)
*A61N 1/378* (2006.01)
(Continued)

(52) U.S. Cl.
CPC ....... *A61N 1/3785* (2013.01); *A61N 1/37512* (2017.08); *A61N 1/3787* (2013.01);
(Continued)

(58) Field of Classification Search
CPC .............. A61N 1/3785; A61N 1/37512; A61N 1/3787; A61N 1/37518; A61N 1/3756;
(Continued)

(56) References Cited

U.S. PATENT DOCUMENTS

2002/0161404 A1  10/2002  Schmidt
2007/0150019 A1*  6/2007  Youker ................ A61N 1/3787
                                                               607/29
(Continued)

FOREIGN PATENT DOCUMENTS

JP   H10511259 A    10/1998
JP   2005507746 A    3/2005
(Continued)

OTHER PUBLICATIONS

International Search Report (PCT/ISA/210) and Written Opinion (PCT/ISA/237) mailed on Mar. 5, 2021, by the European Patent Office as the International Searching Authority for International Application No. PCT/EP2021/050285.
(Continued)

*Primary Examiner* — Carl H Layno
*Assistant Examiner* — Anh-Khoa NN Dinh
(74) *Attorney, Agent, or Firm* — Buchanan Ingersoll & Rooney PC

(57) ABSTRACT

An implantable medical device comprises a housing, a circuit board structure arranged within in the housing and comprising at least one flexible section, an electronic module comprising at least one electronic component arranged on the circuit board structure, and an energy storage device for providing electrical energy for operation of the implantable medical device. The energy storage device is a solid-state battery mounted on the circuit board structure. An energy generation device connected to the energy storage device is a secondary cell, wherein the energy generation
(Continued)

device is configured to convert patient energy to electrical energy for charging the energy storage device.

11 Claims, 2 Drawing Sheets

(51) Int. Cl.
| | |
|---|---|
| *H01M 10/44* | (2006.01) |
| *H01M 10/46* | (2006.01) |
| *H01M 50/204* | (2021.01) |
| *H01M 50/24* | (2021.01) |
| *H01M 50/247* | (2021.01) |
| *H01M 50/264* | (2021.01) |
| *H01M 50/284* | (2021.01) |
| *H02J 7/00* | (2006.01) |
| *H02J 50/10* | (2016.01) |

(52) U.S. Cl.
CPC ........... *H01M 10/44* (2013.01); *H01M 10/46* (2013.01); *H01M 50/204* (2021.01); *H01M 50/24* (2021.01); *H01M 50/247* (2021.01); *H01M 50/264* (2021.01); *H01M 50/284* (2021.01); *H02J 7/0013* (2013.01); *H02J 7/0063* (2013.01); *H02J 50/10* (2016.02); *A61N 1/37518* (2017.08); *A61N 1/3756* (2013.01); *H01M 2220/30* (2013.01)

(58) Field of Classification Search
CPC .. A61N 1/378; A61N 1/3758; A61N 1/37211; A61N 1/375; A61N 1/362; A61N 1/3754; A61N 1/36125; A61N 1/025; A61N 1/3605; A61N 1/3752; A61N 1/3956; A61N 2001/37294; A61N 1/0404; A61N 1/05; A61N 1/0509; A61N 1/0519; A61N 1/0521; A61N 1/0546; A61N 1/30; A61N 1/303; A61N 1/403; A61N 2005/007; A61N 2005/0606; A61N 5/00; A61N 5/0603; A61N 5/067; H01M 10/44; H01M 10/46; H01M 50/204; H01M 50/24; H01M 50/247; H01M 50/264; H01M 50/284; H01M 2220/30; H02J 7/0013; H02J 7/0063; H02J 50/10; Y02E 60/10; H05K 3/341; A23B 9/04; A23B 9/08; A61B 1/04; A61B 1/24

See application file for complete search history.

(56) References Cited

U.S. PATENT DOCUMENTS

| | | | |
|---|---|---|---|
| 2008/0001577 | A1 | 1/2008 | Sather |
| 2010/0317929 | A1* | 12/2010 | Mi ..................... A61N 1/37288 600/300 |
| 2012/0101540 | A1 | 4/2012 | O'Brien et al. |
| 2016/0166837 | A1* | 6/2016 | Strommer ........... H01M 10/425 607/116 |
| 2017/0202467 | A1* | 7/2017 | Zitnik .................. A61N 1/3787 |
| 2018/0078774 | A1 | 3/2018 | Strommer et al. |
| 2018/0091022 | A1* | 3/2018 | Garrison ................... H02J 7/32 |
| 2018/0289971 | A1* | 10/2018 | Yeh ...................... A61N 1/3787 |
| 2019/0275328 | A1 | 9/2019 | Zitnik et al. |
| 2022/0082658 | A1 | 3/2022 | Paul |

FOREIGN PATENT DOCUMENTS

| | | |
|---|---|---|
| JP | 2011524789 A | 9/2011 |
| JP | 2011525099 A | 9/2011 |
| JP | 2016537045 A | 12/2016 |
| JP | 2017136331 A | 8/2017 |
| JP | 2019534113 A | 11/2019 |
| WO | 2019093174 A1 | 5/2019 |

OTHER PUBLICATIONS

Japanese Office Action for Japanese Patent Application No. 2022-538079 dated Nov. 8, 2024 (English Translation).

Office Action for Japanese Patent Application No. 2022-538079 dated Apr. 17, 2025 (English Translation).

* cited by examiner

IMPLANTABLE MEDICAL DEVICE COMPRISING AN ENERGY STORAGE DEVICE

CROSS-REFERENCE TO RELATED APPLICATIONS

This application is the United States National Phase under 35 U.S.C. § 371 of PCT International Patent Application No. PCT/EP2021/050285, filed on Jan. 8, 2021, which claims the benefit of European Patent Application No. 20154891.4, filed on Jan. 31, 2020, the disclosures of which are hereby incorporated by reference herein in their entireties.

TECHNICAL FIELD

The instant invention relates to an implantable medical device according to the preamble of claim 1 and to a method for producing an implantable medical device.

BACKGROUND

An implantable medical device of this kind comprises a housing, a circuit board structure received in the housing and comprising at least one flexible section, an electronic module comprising at least one electronic component arranged on the circuit board structure, and an energy storage device for providing electrical energy for operation of the implantable medical device.

Such implantable medical device shall be configured for implantation into a patient. An implantable medical device in this context may, for example, be a pacemaker device, such as a leadless pacemaker, for providing for a pacing action in a patient's heart, or a defibrillator device, such as an implantable cardioverter-defibrillator (ICD), for providing for a defibrillation, or a sensor device having a sensing function for monitoring, for example, a cardiac activity of a patient. In addition, the implantable medical device may be a recording device, such as a loop recorder, or a transmitter device for transmitting signals to device external to a patient, or a data carrier, such as a patient identification device.

Implantable medical devices, in particular implantable medical devices which shall be directly implanted into a patient's vessel, such as the patient's heart, for example, a leadless pacemaker, shall be small in size, relevant components of the device—such as an energy storage, a control circuitry and a communication unit—being encompassed in the housing in an encapsulated, fluid-tight fashion. A communication unit herein may provide for a communication with an external device, such as a programmer wand, to allow for a data exchange with an external device (for example, for configuring the implantable medical device or for transferring information, such as monitoring data, to the external device) or for charging the implantable medical device in an implanted state.

Typically, an energy storage device in the shape of a battery of an implantable medical device, such as a pacemaker device or a defibrillator device, is rather large in size and takes up substantial space within a housing. A battery herein typically is provided as a separate component to an electronic module of the implantable medical device, such that for assembling the implantable medical device it is required to electrically connect the energy storage device in the shape of the battery to the electronic module and to mount the energy storage device in a dedicated space within the housing. This may add to the complexity for assembling an implantable medical device and may also add to the costs.

Batteries used in an implantable medical device, such as a pacemaker device, nowadays typically are based on technologies employing lithium. Other types of batteries exist, in particular so-called solid-state batteries, which are usable, for example, for Internet-of-Things (IoT) applications.

Solid-state batteries are, for example, described in U.S. Publication No. 2008/0001577 A1.

The present disclosure is directed toward overcoming one or more of the above-mentioned problems, though not necessarily limited to embodiments that do.

SUMMARY

It is an object of the instant invention to provide an implantable medical device and a method for producing an implantable medical device which allow for an easy and cost efficient production and a miniaturization in particular for use in an implantable medical device which shall be implanted directly into a patient's vessel, such as a leadless pacemaker to be implanted in the patient's heart.

At least this object is achieved by means of an implantable medical device comprising the features of claim 1.

Accordingly, the energy storage device is a solid-state battery mounted on the circuit board structure.

The circuit board structure forms a carrier for carrying electronic components of an electronic module to be arranged within the housing of the implantable medical device. According to an embodiment of the present invention, the circuit board structure at least partially is flexible such that it may be flexibly adapted in its shape for arranging the electronic module within the housing. Because the circuit board structure as a whole is flexible or comprises at least one or multiple flexible sections, it may be adapted in its shape, for example, folded, such that the electronic components of the electronic module may be placed on a coherent, connected structure and may be arranged within the housing of the implantable medical device by flexibly bringing the circuit board structure into a compact shape that it may be placed within a corresponding space within the housing.

Together with the electronic components of the electronic module, herein, the energy storage device is mounted on the circuit board structure. The energy storage device has the shape of a solid-state battery, which may be mounted on a surface of the circuit board structure together with one or multiple electronic components, such that a compact assembly of the electronic module in combination with the energy storage device is obtained and may be arranged within the housing in a compact fashion.

Because the energy storage device is mounted on the circuit board structure together with the electronic components, the production of the implantable medical device may be eased, in that the electronic components of the electronic module and the energy storage device may be placed on the circuit board structure in a common mounting process. The assembly of the implantable medical device may be facilitated, because no additional step of arranging the energy storage device in the housing is required. In addition, no additional electrical leads for connecting the energy storage device to the electronic module are required, because an electrical connection of the energy storage device to the electronic module may be achieved via the circuit board structure comprising a pattern of electrical conduction paths.

In one embodiment, the housing is hermetically sealed such that a chamber within the housing is closed against an entry of fluid. Components arranged within the housing hence are sealed in a fluid-tight manner, such that no fluid may enter into the housing when the medical device is implanted in a patient.

Herein, the fluid-tight seal may be achieved by covering the housing by a hermetically tight, biocompatible sealing layer. Whereas the housing may be made from a metal material, for example, a titanium material, the sealing layer may be made from a plastics material, such as a coating of a polymer material, for example, a parylene material. Other polymer materials which are inert, hydrophobic, transparent are applicable as well as sealing layer material.

In one embodiment, the at least one electronic component and the energy storage device are mounted on the circuit board structure using the same mounting technology. Generally, electronic components may be mounted on a circuit board structure using conventional mounting technologies, such as a surface-mount technology (SMT), a 3D packaging technology or the embedding technology. In one embodiment, both the at least one electronic component and the energy storage device are mounted on the circuit board structure as surface-mount devices (SMD) using a surface-mount technology (SMT). By employing the same mounting technology for mounting the at least one electronic component and the energy storage device on the circuit board structure, the at least one electronic component and the energy storage device may be arranged on the circuit board structure in the same processing step, using, for example, a reflow process for establishing a soldering connection for the at least one electronic component as well as for the energy storage device.

The surface-mount technology (SMT) generally is understood as a method for producing electronic circuits in which electronic components are placed directly on the surface of a circuit board structure. Surface-mount devices (SMD) may be small in size, allowing for a miniaturization of devices. Electronic components in the shape of surface-mount devices usually comprise solder pads, by means of which the electronic components are placed on a circuit board structure, in particular a so-called printed circuit board. By placing the circuit board structure, for example, within a reflow soldering oven soldering connections in between the electronic components and the circuit board structure may be established.

In one embodiment, the energy storage device is a primary cell or a secondary cell. If the energy storage device is a primary cell, it is not rechargeable. If the energy storage device is a secondary cell, it is rechargeable, such that it may receive electrical energy and hence may be recharged in order to prolong operation of the implantable medical device.

Generally, a primary cell is understood to be a battery (a galvanic cell) that is designed to be used once, and not recharged with electricity and reused, because the electrochemical reaction occurring in the cell is not reversible, rendering the cell non-rechargeable. In contrast, in a secondary cell a reaction can be reversed by feeding a current into the cell.

In one embodiment, the implantable medical device comprises a coupling interface connected to the energy storage device, which in this case is a secondary cell, wherein the coupling interface is configured to couple to an external device for wirelessly receiving electrical energy from the external device for charging the energy storage device. The coupling interface may, for example, allow for an inductive coupling in between the implantable medical device and the external device, which, when the medical device is implanted in a patient, is placed outside of the patient. For this, the coupling interface may, for example, comprise a coil arrangement which allows for an inductive transfer of energy in between the external device and the medical device. By transferring energy from the external device to the medical device, hence, the energy storage device may be recharged in order to continue operation of the medical device.

In one embodiment, the implantable medical device comprises an energy generation device connected to the energy storage device, which in this case is a secondary cell. The energy generation device is configured to convert patient energy to electrical energy for charging the energy storage device. The energy generation device hence serves as an energy converter which takes up energy from the patient, such as kinetic energy or thermal energy, and converts the energy to electrical energy by means of which the energy storage device can be recharged.

For example, the energy generation device may comprise a movable element which is moved by kinetic energy present within the patient, for example, by a blood flow or by movement of the patient's heart. By moving the movable element electrical energy can be generated, which can be fed for recharging to the energy storage device.

In addition or alternatively, the energy generation device may comprise a piezo element allowing for a conversion of mechanic energy to electricity.

In one embodiment, the implantable medical device comprises a further energy storage device separate to the energy storage device placed on the circuit board structure. The further energy storage device may act as a supplementary energy source for providing electrical energy for operation of the implantable medical device. The further energy storage device may also be mounted on the circuit board structure, or may be separate from the circuit board structure. The further energy storage device may, for example, be a solid-state battery or a lithium-based battery.

The further energy storage device may act as a supplementary energy source. Herein, a regular operation of the medical device may be powered by the (main) energy storage device placed on the circuit board structure, this energy storage device, for example, being rechargeable. The further energy storage device may serve as a power backup and may, for example, be non-rechargeable.

The circuit board structure may have different shapes. For example, the circuit board structure may comprise rigid sections and flexible sections, the flexible sections, for example, interconnecting the rigid sections, wherein electronic components and the energy storage device are, for example, connected to the rigid sections. By providing flexible sections, the circuit board structure, for example, may be folded such that it may be placed within the housing for assembling the implantable medical device.

In one embodiment, the housing has an oblong shape extending along a longitudinal axis, wherein the circuit board structure comprises a mounting plate extending along a plane oriented perpendicularly to the longitudinal axis, the energy storage device being fastened to the mounting plate. The mounting plate, which may have the shape of a rigid section, is hence extended along a plane transverse to the longitudinal axis of the housing of the implantable medical device, the mounting plate serving to carry the energy storage device.

In one embodiment, the circuit board structure comprises multiple mounting plates which extend along different planes oriented, for example, perpendicularly to the longitudinal axis of the housing, or in parallel or at a skewed angle with respect to the longitudinal axis of the housing.

The mounting plates may, for example, extend in parallel to one another and may be displaced with respect to each other, such that mounting plates on different levels are provided and arranged within the housing of the implantable medical device. On one of those mounting plates herein the energy storage device may be fastened and electrically connected to the associated mounting plate. On another mounting plate electrical and electronic components, such as a control circuitry, may be received such that the circuit board structure provides for an assembly of a circuitry of the implantable medical device.

The energy storage device may, for example, be received in between two neighboring mounting plates of the multiple mounting plates. The energy storage device herein, for example, is mechanically and electrically fastened to one of the mounting plates, another mounting plate being arranged at a side opposite to the mounting plate to which the energy storage device is mechanically fastened and electrically connected.

In one embodiment, each flexible section of the circuit board structure connects two neighboring mounting plates with each other. The circuit board structure may, in one embodiment, form a zig-zag shape (also denoted as "accordion" shape) in that a first mounting plate is connected via a first flexible section at a first side to a second mounting plate, and the second mounting plate is connected via a second flexible section at a second side opposite the first side to a third mounting plate. By means of further flexible sections further mounting plates may adjoin the third mounting plate, such that multiple mounting plates by means of flexible sections are interconnected which each other and form a zig-zag (accordion) shape in that the flexible sections are arranged on diametrically opposite sides in an alternating fashion.

The flexible sections may be formed by so-called flex-bands, such flex-bands providing for a mechanical interconnection as well as for electrical conduction paths in between neighboring mounting plates.

The mounting plates may be fabricated from a conventional, substantially rigid circuit board material such as FR4, a conducting-path structure being formed on each mounting plate for providing for a desired electrical function.

By equipping an implantable medical device with a circuit board structure having a zig-zag (or "accordion") shape comprising multiple mounting plates on which electrical or electronic components are received, a compact design of the implantable medical device becomes possible, allowing, in particular, for a space-efficient arrangement of an energy storage device within the housing of the implantable medical device.

The implantable medical device may be a pacemaker, in particular a leadless pacemaker, a sensor, e.g., a pressure sensor, an implantable transmitter, or an implantable data carrier, e.g., a patient identification device.

At least the above object is also achieved by means of a method for producing an implantable medical device, comprising: providing a housing; providing a circuit board structure to be received in the housing, the circuit board structure comprising at least one flexible section; providing an electronic module by mounting at least one electronic component on the circuit board structure; and providing an energy storage device for providing electrical energy for operation of the implantable medical device. The energy storage device, which is a solid-state battery, herein is mounted on the circuit board structure.

The advantages and advantageous embodiments described above for the implantable medical device equally apply also to the method, such that it shall be referred to the above.

In one embodiment, the at least one electronic component of the energy storage device may both be mounted on the circuit board structure using a surface-mount technology, the at least one electronic component and the energy storage device being surface-mount devices. The mounting of the at least one electronic component and the energy storage device on the circuit board structure may take place, for example, using a reflow process by placing the circuit board structure with the at least one electronic component and the energy storage device arranged thereon in a reflow soldering oven, wherein the at least one electronic component and the energy storage device may be mounted to the circuit board structure simultaneously in a common step.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

Various features and advantages of the present invention may be more readily understood with reference to the following detailed description and the embodiments shown in the drawings. Herein.

DETAILED DESCRIPTION

Figure 1:
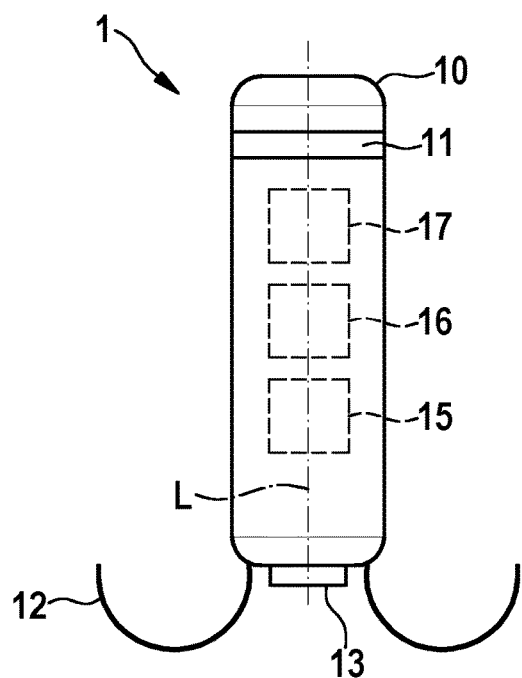
FIG. 1 shows a schematic illustration of an implantable medical device.

Subsequently, embodiments of the present invention shall be described in detail with reference to the drawings. In the drawings, like reference numerals shall designate functionally similar structural elements, if appropriate.

It is to be noted that the embodiments are not limiting for the present invention, but merely represent illustrative examples.

FIG. 1 shows a schematic illustration of an implantable medical device 1, for example, in the shape of an intracardiac pacing system (also denoted as implantable leadless pacemaker). The implantable medical device 1 comprises a housing 10 which encompasses an energy storage device 15, an electronic module 16, and a coupling interface 17. The housing 10 may comprise titanium or may be made of titanium.

As visible from FIG. 1, the housing 10 of the implantable medical device 1 has a generally oblong, for example, cylindrical shape extending along a longitudinal axis L.

At a distal end of the housing 10, a first electrode 13 (also called pacing electrode) is disposed. In a proximal region of the housing 10, a second electrode 11 (also called sensing electrode) is arranged. The second electrode 11 may be formed as a ring electrode.

The implantable medical device 1 may be fixed to cardiac tissue by a fixation device 12. The fixation device 12 may be formed by tines comprising Nitinol or being made of Nitinol. In one embodiment, four tines made of Nitinol may be formed at the distal end of the housing 10.

The energy storage device 15 is configured to provide electrical energy to the components of the implantable medical device 1, in particular to the electronic module 16, the coupling interface 17, and the electrode arrangement of the first electrode 13 and the second electrode 11.

The electronic module 16 may be configured to perform the functions of a pacemaker, including sensing cardiac events and providing pacing pulses. The electronic module 16 may comprise a processor and memory.

The coupling interface 17 may be configured for communication with an external device (e.g., a programmer wand). The coupling interface 17 may be configured to inductively couple to an external communication coil for providing for a communication.

In an implanted state, the implantable medical device 1, at its distal end, is placed on tissue, for example, cardiac tissue of a patient's heart, such that the tines of the fixation device 12 engage with the tissue and the electrode 13 comes to rest on tissue such that it electrically contacts with the tissue. By means of the electrode arrangement formed by the electrodes 11, 13, hence, electrical energy may be injected into the tissue for providing a stimulation, for example, a pacing action or a defibrillation.

Figure 2:
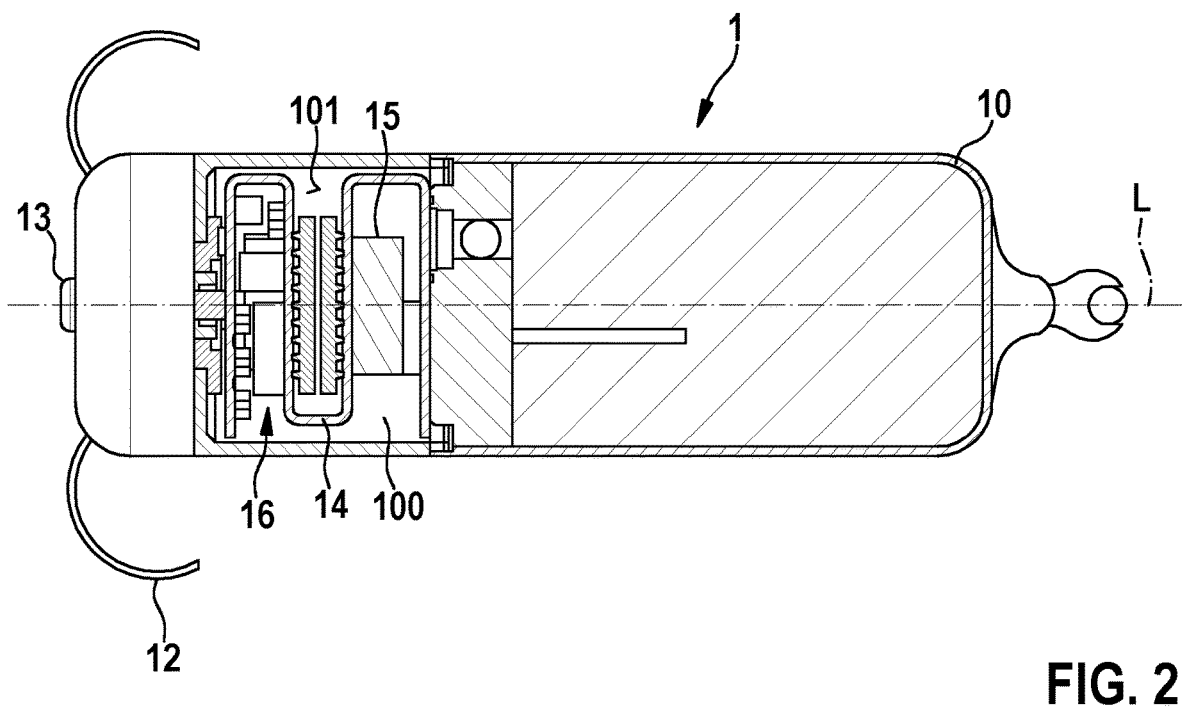
FIG. 2 shows a view of an embodiment of an implantable medical device.

Referring now to FIG. 2, an implantable medical device 1 in the shape of a leadless pacemaker comprises a housing 10, at a distal end of which a fixation device 12 having tines for fixing the device to cardiac tissue is arranged and an electrode 13 is disposed. The implantable medical device 1 may further comprise some or all components as described above in the context of FIG. 1.

Similarly to the embodiment of FIG. 1, in the embodiment of FIG. 2, the implantable medical device 1 has an oblong shape, the housing 10 of the implantable medical device 1 extending along a longitudinal axis L. The implantable medical device 1 may, for example, have the shape of a cylindrical capsule, the housing 10 having a length as measured along the longitudinal axis L substantially exceeding the diameter of the housing 10 as measured in a plane perpendicular to the longitudinal axis L.

Figure 3:
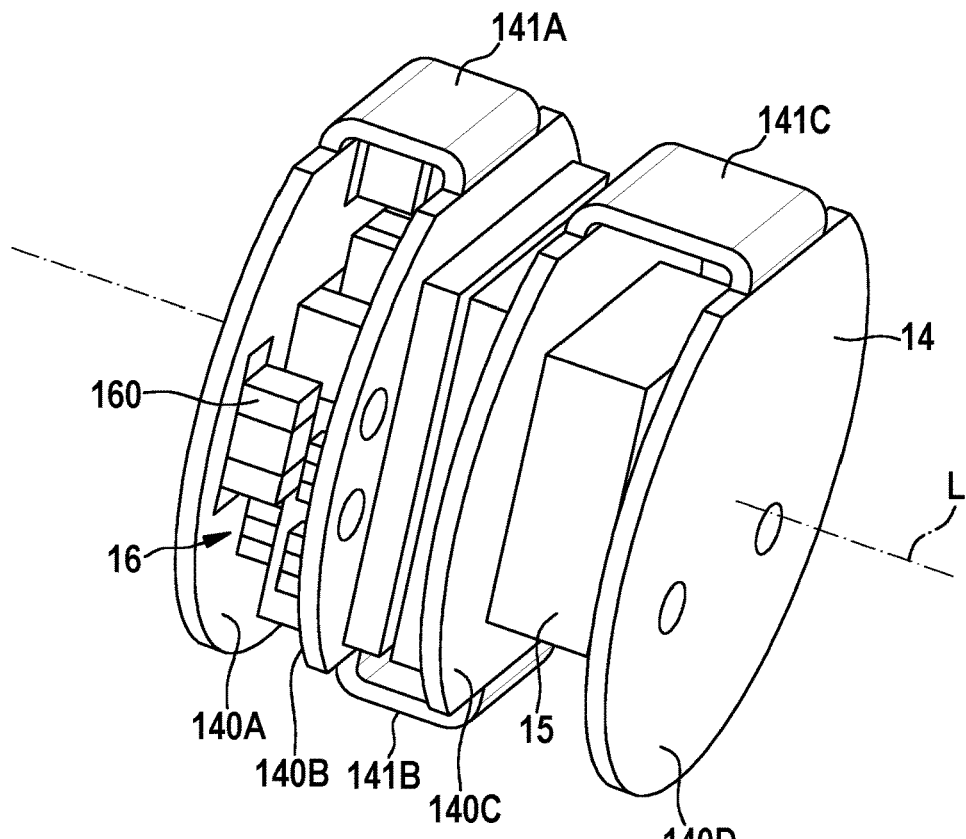
FIG. 3 shows a view of an embodiment of a folded circuit board.

In the embodiment of FIG. 2, the implantable medical device 1 comprises a circuit board structure 14 comprising a flex-circuit printed circuit board (PCB) folded into a zig-zag ("accordion") shape, as illustrated in another view in FIG. 3. The circuit board structure 14 comprises multiple mounting plates 140A-140D which extend along parallel planes perpendicular to the longitudinal axis L and hence are offset with respect to each other along the longitudinal axis L. Neighboring mounting plates 140A-140D herein are connected to each other by flexible sections 141A-141C such that an interlinked circuit board structure 14 is formed carrying electrical and electronic components of the implantable medical device 1.

Within the circuit board structure 14, the zig-zag shape is formed in that the mounting plates 140A-140D are connected to each other by means of the flexible sections 141A-141C in an alternating fashion at diametrically opposite sides with respect to the longitudinal axis L. In particular, a first mounting plate 140A carrying components 160 of an electronic module 16 is connected to a neighboring, second mounting plate 140B by means of a flexible section 141A on a first side of the longitudinal axis L, as this is visible in FIG. 3. The mounting plate 140B is connected to a neighboring, third mounting plate 140C by means of an flexible section 141B, the flexible section 141B being formed at a side diametrically opposite, with respect to the longitudinal axis L, to the flexible section 141A. The mounting plate 140C in turn by means of a flexible section 141C is connected to another, fourth mounting plate 140D, the flexible section 141C again being located at a side of the longitudinal axis L diametrically opposite to the flexible section 141B, as visible from FIG. 3.

The flexible sections 141A-141C may be formed by so-called flex-bands mechanically interconnecting the mounting plates 140A-140D. Conduction paths herein may be formed on the flexible sections 141A-141C such that via the flexible sections 141A-141C also an electrical interconnection in between the mounting plates 140A-140D is established.

The mounting plates 140A-140D each have a substantially circular shape, when viewed in an associated plane perpendicular to the longitudinal axis L of the implantable medical device 1. The circuit board structure 14 herein is received within a chamber 100 formed by the housing 10 and confined by an inner, cylindrical wall 101 surrounding the chamber 100. The shape of each mounting plate 140A-140D substantially conforms to the circular cross-sectional shape of the chamber 100, such that the circuit board structure 14 is arranged within the housing 10 in a space-efficient manner.

Because multiple mounting plates 140A-140D are stacked and displaced with respect to each other along the longitudinal axis L, electrical and electronic components may be arranged within the housing 10 in a space-efficient, stacked manner, allowing to design a compact implantable medical device 1 having reduced space requirements and an increased packing density.

Electronic components 160 received on the mounting plate 140A may, for example, comprise a processor and a memory, for example, in the shape of integrated circuits (ICs).

The implantable medical device 1 comprises an energy storage device 15 in the shape of a solid-state battery arranged on the mounting plate 140C, the energy storage device 15 being mechanically connected and electrically contacted to the mounting plate 140C. The energy storage device 15 herein, in the embodiment of FIGS. 2 and 3, is received in between two neighboring mounting plates 140C, 140D.

By providing an energy storage device 15 in the shape of a solid-state battery, which together with electronic components 160 is arranged on the circuit board structure 14, an easy assembly of the implantable medical device 1 may be achieved, in that the energy storage device 15 and the electronic module 16 form a combined module which may be placed as such in the housing 10, hence avoiding the need for a separate assembly of an energy storage device 15 in the shape of a battery in the housing 10. In addition, because the energy storage device 15 is arranged on the circuit board structure 14 and hence is electrically connected to the conduction paths of the circuit board structure 14 and via the conduction paths to the circuitry of the electronic module 16, no need for an additional electrical connection in between a (separate) energy storage device and the electronic module 16 is required, hence facilitating production of the medical device 1.

A solid-state battery employs a battery technology that uses solid electrodes and a solid electrolyte. Materials useable as solid electrolytes in solid-state batteries may, for example, include ceramics (e.g., oxides, sulfides or phosphates), and solid polymers.

By receiving the energy storage device 15 in between mounting plates 140C, 140D, which are interlinked by a flexible section 141C, the energy storage device 15 is arranged within the housing 10 in a space-efficient manner.

Figure 4:
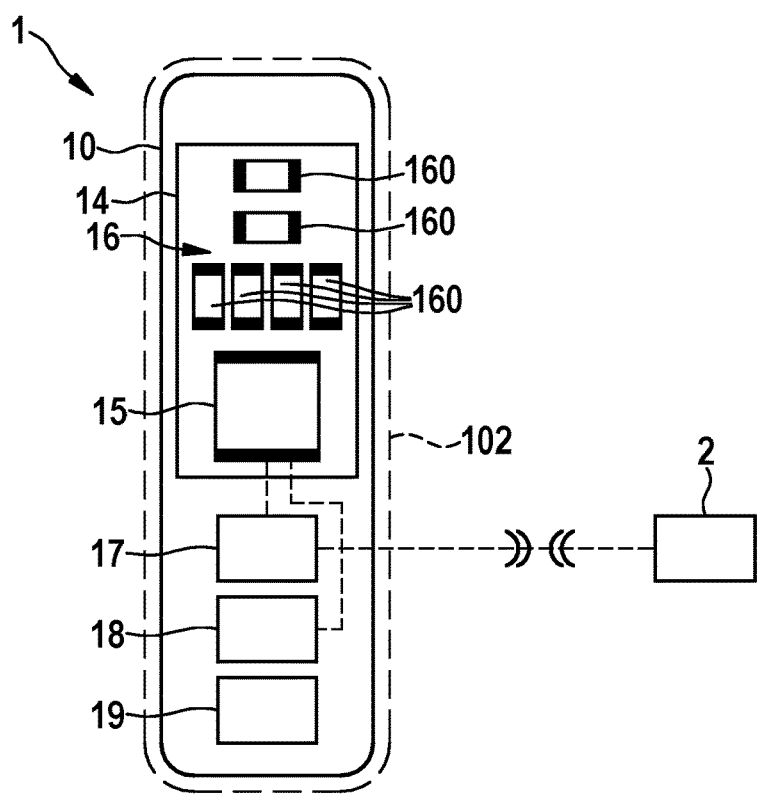
FIG. 4 shows a schematic drawing of an embodiment of an implantable medical device.

Referring now to FIG. 4, an electronic module 16 may comprise multiple electronic components 160, including, for example, processor devices and memory devices. The electronic components 160 are placed on a circuit board structure 14, which at least partially is flexible such that it may be flexibly deformed for placing it within the housing 10 of the implantable medical devices 1 during assembly.

Together with the electronic components 160, an energy storage device 15 in the shape of a solid-state battery is placed on the circuit board structure 14, the electronic components 160 and the energy storage device 15 being mounted to the circuit board structure 14, for example, using the same mounting technology, in particular a surface-mount technology (SMT), such that the electronic components 160 as well as the energy storage device 15 are surface-mount devices (SMD).

For manufacturing the electronic module 16, the electronic components 160 as well as the energy storage device 15 is placed on the circuit board structure 14, wherein soldering connections in between the circuit board structure 14 and electronic components 160, respectively, the energy storage device 15 are established in a common process, such as a common reflow process by placing the circuit board structure 14 with the electronic components 160 and the energy storage device 15 arranged thereon in a reflow soldering oven in order to establish soldering connections using a reflow process.

The energy storage device 15 in the shape of the solid-state battery, as shown in FIG. 4, may, in particular, be a secondary cell, which is rechargeable. A recharging herein, for example, may take place by means of a coupling interface 17, which, for example, is configured to inductively couple to an external device 2. Hence, using the coupling interface 17, a recharging of the energy storage device 15 may be achieved in an implanted state of the medical device 1 by coupling the external device 2, which is placed outside of the patient, inductively to the coupling interface 17 and to in this way transfer electrical energy towards the medical device 1 for recharging the energy storage device 15.

Alternatively or in addition, the medical device 1 may comprise an energy generation device 18, which is configured to convert patient energy, i.e., energy originating from the patient, to electrical energy for charging the energy storage device 15. The energy generation device 18 may, for example, convert kinetic energy stemming from the patient, for example, flow energy of a blood flow or kinetic energy of the patient's heart, to electrical energy and may feed a current generated in this way to the energy storage device 15.

The energy generation device 18 may, for example, comprise a movable element which may be moved by a blood flow or by cardiac movement.

Alternatively or in addition, the energy generation device 18 may, for example, comprise an arrangement of piezo elements which may convert mechanic energy to electrical energy.

In one embodiment, the medical device 1 comprises an additional, further energy storage device 19, which may be a solid-state battery or another type of battery, such as a lithium-based battery. The additional, further energy storage device 19 may be placed on the circuit board structure 14 or may be separate from the circuit board structure 14. The further energy storage device 19 may be a non-rechargeable primary cell or a rechargeable secondary cell and may, in particular, supplement an energy supply for operation of the medical device 1.

In one embodiment, the housing 10 of the medical device 1 is hermetically sealed by a sealing layer 102, formed, for example, from a polymer coating material, such as a parylene coating. By means of the sealing layer 102, the housing 10 is enclosed and hence sealed towards the outside, such that no fluid may enter into the housing 10. Due to the coating by the sealing layer 102, requirements for a biocompatibility of the housing 10 itself, in particular the material of the housing 10, and for a fluid tightness of the housing 10 itself may be reduced.

By using a solid-state battery as an energy storage device in combination with a flexible circuit board, a miniaturization of a medical device becomes possible, which, in particular, allows a design of small-sized stimulation devices or sensing devices, such as a leadless pacemaker device or an implantable sensor, for example, in implantable pressure sensor.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

LIST OF REFERENCE NUMERALS

1 Implantable medical device (pacemaker device)
10 Housing
100 Chamber
101 Inner wall
102 Sealing layer
11 Electrode
12 Fixation device
13 Electrode
14 Circuit board structure
140A-140D Mounting plate
141A-141C Flexible section
15 Energy storage device
16 Electronic module
160 Electronic components
17 Coupling interface
18 Energy generation device
19 Further energy storage device
2 External device
B Body
C Chest
D Height
L Longitudinal axis
M Magnetic field
R Back
T Transverse direction
W Width

The invention claimed is:

1. An implantable medical device, comprising: a housing; a circuit board structure arranged within in the housing and comprising a mounting plate and at least one flexible section; an electronic module comprising at least one electronic component arranged on the circuit board structure; an energy storage device comprising a rechargeable solid-state battery for providing electrical energy for operation of the implantable medical device; and a supplemental energy storage device comprising a non-rechargeable battery to serve as a power backup, wherein the energy storage device and the supplemental energy storage device are mechanically connected and electrically contacted to the mounting plate, wherein implantable medical device includes an energy generation device connected to the energy storage device, wherein the energy generation device comprises a piezo element configured to convert patient energy to electrical energy for charging the energy storage device.

2. The implantable medical device of claim 1, wherein the housing is hermetically sealed such that a chamber within the housing is sealed against an entry of fluid, and wherein the housing is hermetically sealed by a hermetically tight, biocompatible sealing layer.

3. The implantable medical device of claim 1, wherein the at least one electronic component and the energy storage device are mounted on the circuit board structure using a same mounting technology.

4. The implantable medical device of claim 1, wherein the at least one electronic component and the energy storage device are mounted on the circuit board structure as surface-mount devices using a surface-mount technology.

5. The implantable medical device of claim 1, further comprising a coupling interface connected to the energy storage device being a secondary cell, wherein the coupling interface is configured to couple to an external device for wirelessly receiving electrical energy from the external device for charging the energy storage device.

6. The implantable medical device of claim 1, wherein the housing has an oblong shape extending along a longitudinal axis, wherein the mounting plate extends along a plane oriented perpendicularly to the longitudinal axis.

7. The implantable medical device of claim 1, wherein the circuit board structure comprises at least one additional mounting plates, each mounting plate extending along different planes.

8. The implantable medical device of claim 7, wherein the at least one flexible section connects two neighboring mounting plates with each other.

9. The implantable medical device of claim 7, wherein the circuit board structure forms a zig-zag shape in that a first mounting plate is connected via a first flexible section at a first side to a second mounting plate, and the second mounting plate is connected via a second flexible section at a second side opposite the first side to a third mounting plate.

10. A method for producing an implantable medical device, comprising: providing a housing; providing a circuit board structure to be received in the housing, the circuit board structure comprising a mounting plate and at least one flexible section; providing an electronic module by mounting at least one electronic component on the circuit board structure; providing an energy storage device comprising a rechargeable solid-state battery for providing electrical energy for operation of the implantable medical device; providing a supplemental energy storage device comprising a non-rechargeable battery to serve as a power backup, mechanically connecting and electrically contacting the energy storage device and the supplemental energy storage device to the mounting plate, and connecting an energy generation device to the energy storage device, wherein the energy generation device comprises a piezo element configured to convert patient energy to electrical energy for charging the energy storage device.

11. The method of claim 10, wherein the at least one electronic component and the energy storage device are mounted on the circuit board structure as surface-mount devices in a reflow process.

\* \* \* \* \*